D. M. Tyler,
Water Wheel,

No. 16,027.    Patented Nov. 4, 1856.

UNITED STATES PATENT OFFICE.

DAVID M. TYLER, OF LISLE, NEW YORK.

IMPROVED METHOD OF STARTING AND STOPPING WATER-WHEELS.

Specification forming part of Letters Patent No. 16,027, dated November 4, 1856.

*To all whom it may concern:*

Be it known that I, DAVID M. TYLER, of Lisle, in the county of Broome and State of New York, have invented a new and useful Improvement in Water-Wheels; and I do hereby declare that the following is a full, clear, and exact description of the construction and operation of the same, reference being had to the annexed drawings, forming part of this specification, in which—

Figure 1:
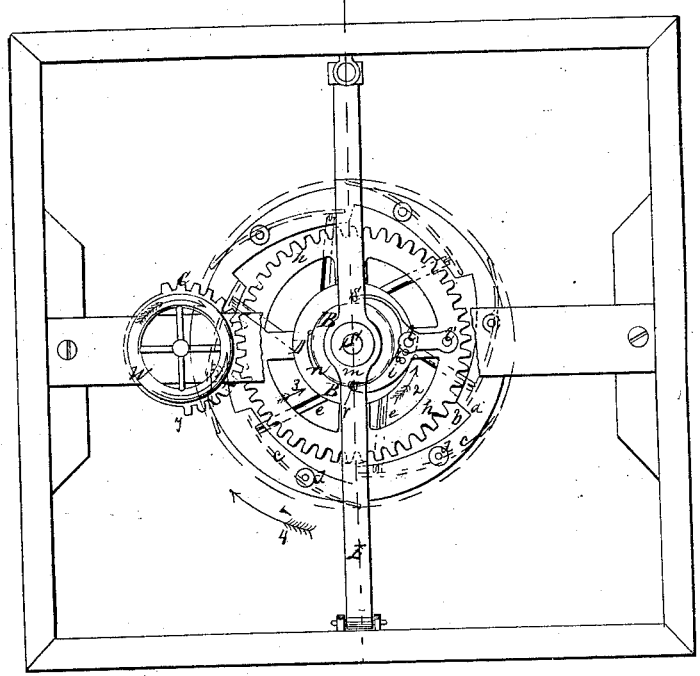
Figure 2:
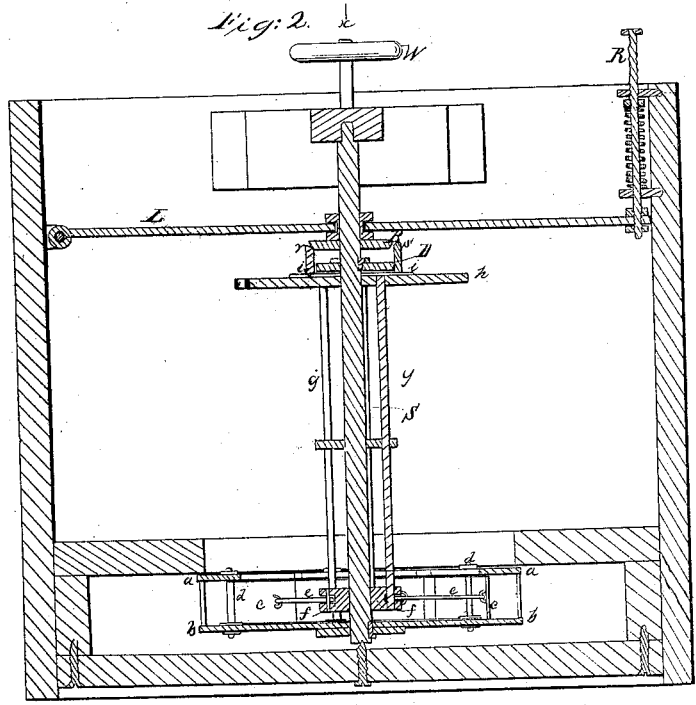

Figure 1 is a plan view of wheel and mechanism connected therewith. Fig. 2 is a vertical section on $x\ x$.

Similar characters of reference in the several figures denote the same part.

The object of my invention is in a simple and effectual manner to render the buckets of reaction water-wheels the gates by which the power is brought into action or the wheel stopped, as may be desired.

The invention consists in so swinging the buckets upon bolts passing through them and the plates that the outward pressure of the water will close the buckets when the resistance is removed, and in connecting these buckets by rods with a frame movable around the main shaft and locked, as will be hereinafter set forth, the dimensions of the issues being also capable of adjustment.

In the drawings, $a$ is the top and $b$ the bottom plate of the wheel, between which are hung the buckets $c$, so as to be movable about the axes of bolts $d$, and so regulated that the pressure of the water will close said buckets upon each other and stop the wheel. The buckets are connected by rods $e$ with a ring $f$, movable upon the main shaft S and constituting the lower portion of a frame consisting of wheel $h$, rods $g$, and the aforesaid ring. The turning of this frame about the shaft effects the opening of the issues. The locking of this frame after turning is effected by the spring-dog $i$, attached by a bolt $l$ to the wheel $h$ and embracing the notched disk D, secured upon the main shaft. This disk has two notches $m$ and $n$, into the former of which the point $p$ of the dog enters when the issues are open, as shown in Fig. 1. The notch $n$ receives the dog when the issues are closed. From the points of the spring-dog arise the studs $r$ and $s$, the former beveled. Above and within these studs is a disk B, having a beveled edge, as shown in Fig. 2.

This disk is movable in direction of the length of the shaft by pressure upon lever L or in any other suitable manner. The effect of downward pressure on this disk is to remove the point $p$ of the spring-dog from the notch $m$ and permit it to slip around until it is caught by the notch $n$. The dog $i$ has several holes $t$ for the reception of the bolt $l$, so that by changing the point of attachment of the dog the size of issue will be regulated. The wheel $h$ meshes with a cogged arc C, moved by wheel W.

The operation of the water-wheel is as follows: The issues being closed, tooth $y$ of arc C is made to engage the wheel $h$ and power applied to wheel W in direction of arrow. This turns wheel $h$ in direction of arrow 2, and drawing-rods $e$, as shown by arrow 3, slightly opens the issues. The discharge of water which then takes place produces the rotation of the wheel in direction of arrow 4, carrying disk D around until point $p$ of dog $i$ drops into notch $m$, the issues gradually increasing in size until this point is reached. The teeth of arc C are then disengaged from wheel $h$, and the water-wheel is in operation. Pressure upon rod R forces down the disk B, causing point $p$ to be removed from notch $m$, when the pressure of the water on the buckets closes the issues and the dog-point $p$ is arrested by notch $n$.

What I claim as new and of my own invention, and desire to secure by Letters Patent, is—

1. The combination of the frame upon the main shaft and the spring-dog $i$ on the same with the notched disk D and the rods leading to the swinging buckets, or their equivalents, for effecting the opening of the issues and locking of the same, substantially as hereinbefore set forth.

2. The beveled disk B, in combination with the studs of the dog or their equivalents, arranged and operating substantially as set forth, for permitting the water in the wheel to close the issues.

In testimony whereof I have hereunto signed my name before two subscribing witnesses.

DAVID M. TYLER.

Witnesses:
 GEO. PATTEN,
 T. C. DOWN.